(12) United States Patent
Masuda et al.

(10) Patent No.: US 10,883,880 B2
(45) Date of Patent: Jan. 5, 2021

(54) OPTICAL CHARACTERISTIC EVALUATION METHOD AND OPTICAL CHARACTERISTIC EVALUATION SYSTEM

(71) Applicant: Konica Minolta, Inc., Tokyo (JP)

(72) Inventors: Osamu Masuda, Machida (JP);
Kazuhiko Hirabayashi, Sagamihara (JP); Hirofumi Tanaka, Akashi (JP); Koji Nakashima, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 16/653,379

(22) Filed: Oct. 15, 2019

(65) Prior Publication Data

US 2020/0132551 A1 Apr. 30, 2020

(30) Foreign Application Priority Data

Oct. 29, 2018 (JP) ................................. 2018-202514

(51) Int. Cl.
*G01J 4/04* (2006.01)
*G01N 21/21* (2006.01)
(Continued)

(52) U.S. Cl.
CPC ............ *G01J 4/04* (2013.01); *G01M 11/0214* (2013.01); *G01M 11/336* (2013.01); *G01N 21/21* (2013.01);
(Continued)

(58) Field of Classification Search
CPC ....................................................... G01J 4/04
(Continued)

(56) References Cited

U.S. PATENT DOCUMENTS

| 6,538,738 B1* | 3/2003 | Okamoto | .............. G02F 1/1309 |
| | | | 356/364 |
| 2005/0036143 A1* | 2/2005 | Huang | ....................... G01J 4/04 |
| | | | 356/369 |

(Continued)

FOREIGN PATENT DOCUMENTS

| JP | 2001290025 A | 10/2001 |
| KR | 10-0392303 B1 | 7/2003 |

OTHER PUBLICATIONS

TIPO, Office Action/Search Report issued in the related Taiwanese Application No. 108132012, dated Sep. 2, 2020, with English translation.

(Continued)

*Primary Examiner* — Tarifur R Chowdhury
*Assistant Examiner* — Omar H Nixon
(74) *Attorney, Agent, or Firm* — Lucas & Mercanti, LLP

(57) ABSTRACT

An optical characteristic evaluation method evaluates unevenness of an optical characteristic in an optical film based on analysis of a polarized state of light transmitting through an optical film and an analyzer. The method includes the following, measuring a phase difference and an orientation angle in a plurality of positions; and quantifying and evaluating the unevenness of the optical characteristic based on a parameter of a vector of output light calculated by a formula 1 using a vector showing a polarized state of input light and a matrix showing a polarizing characteristic of the optical film and the analyzer. The formula 1 is as follows, formula 1: F2=M×F1, F1: Stokes vector or Jones vector of input light, F2: Stokes vector or Jones vector of output light, M: Mueller matrix or Jones matrix of the optical film as the evaluation target and the analyzer.

5 Claims, 4 Drawing Sheets

(51) Int. Cl.
*G02B 5/30* (2006.01)
*G01M 11/00* (2006.01)
*G02F 1/1335* (2006.01)
*G01M 11/02* (2006.01)

(52) U.S. Cl.
CPC ..... *G02B 5/3066* (2013.01); *G02F 1/133536* (2013.01)

(58) Field of Classification Search
USPC .......................................................... 356/364
See application file for complete search history.

(56) References Cited

U.S. PATENT DOCUMENTS

| | | | |
|---|---|---|---|
| 2012/0268718 A1* | 10/2012 | Kobayashi | G02B 27/285 353/20 |
| 2012/0268740 A1* | 10/2012 | Walsh | G01N 21/33 356/327 |
| 2014/0303463 A1* | 10/2014 | Robinson | G01J 3/0262 600/316 |
| 2017/0338874 A1* | 11/2017 | Pratt | H04B 7/10 |
| 2017/0363472 A1* | 12/2017 | Abdulhalim | G01J 3/2823 |

OTHER PUBLICATIONS

KIPO, Office Action/Search Report issued in the related Korean Application No. 10-2019-0132786, dated Nov. 5, 2020, with English translation.

* cited by examiner

OPTICAL CHARACTERISTIC EVALUATION METHOD AND OPTICAL CHARACTERISTIC EVALUATION SYSTEM

BACKGROUND

Technological Field

The present invention relates to an optical characteristic evaluation method and an optical characteristic evaluation system.

Description of the Related Art

Lately, liquid crystal display apparatuses are widely used as televisions and monitors of personal computers. Various optical films including certain functions depending on the optical characteristic are used in the liquid crystal display apparatuses. Such optical films include, a phase difference film, a protection film, a viewing angle enlarging film, and the like.

Lately, due to the improvement in contrast characteristics in the liquid crystal display apparatus, the demand for higher quality in optical films is also rising. Since the liquid crystal display apparatus uses birefringence characteristics in the liquid crystal to obtain contrast, image quality of the liquid crystal display apparatus depends on the optical characteristics of the optical film which is used. Therefore, preferably, the optical characteristics of the optical film is even throughout the entire optical film. However, when the optical film is extended in the process of manufacturing, the optical characteristics may become uneven. Due to such unevenness in the optical characteristics, variation in brightness occurs in the screen of the liquid crystal display, resulting in display irregularity.

The optical characteristics of the optical film is evaluated and examination to determine whether the optical characteristics are even is performed. For example, JP 2001-290025 describes a method to embed a created optical film in a liquid crystal display apparatus and to evaluate display irregularity by sight on the screen.

However, according to the method to actually make a liquid crystal display apparatus as described in JP 2001-290025, the burden of the processes is large, and the process is troublesome.

There is also a method to place the optical film between a polarizing plate and to evaluate the optical film by sight. However, according to such method, there may be a variation in the standard of evaluation depending on the person, and the quantitative evaluation becomes difficult.

SUMMARY

An object of the present invention is to provide an optical characteristic evaluation method and an optical characteristic evaluation system which can easily and quantitatively evaluate unevenness in optical characteristics of an optical film as a target of evaluation.

To achieve at least one of the abovementioned objects, according to an aspect of the present invention, an optical characteristic evaluation method reflecting one aspect of the present invention evaluates unevenness of an optical characteristic in an optical film based on analysis of a polarized state of light transmitting through an optical film as an evaluation target and an analyzer, the method including:

measuring a phase difference and an orientation angle in the optical film in a plurality of positions; and quantifying and evaluating the unevenness of the optical characteristic based on a parameter of a vector of output light calculated by the following formula 1 using a vector showing a polarized state of input light and a matrix showing a polarizing characteristic of at least the optical film and the analyzer, wherein, $$F2 = M \times F1 \qquad \text{formula 1}$$

F1: Stokes vector or Jones vector of input light
F2: Stokes vector or Jones vector of output light
M: Mueller matrix or Jones matrix of the optical film as the evaluation target and the analyzer.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention.

DETAILED DESCRIPTION OF EMBODIMENTS

Figure 1:
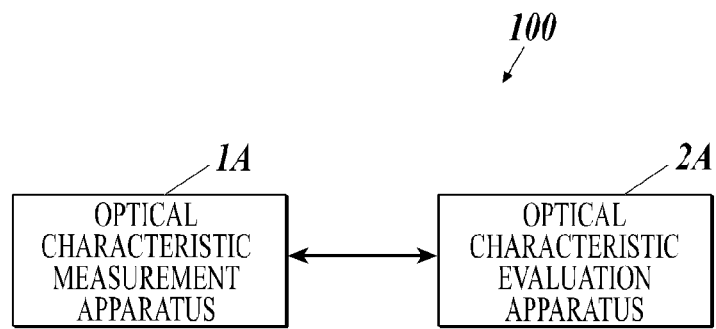
FIG. 1 is a diagram showing a schematic configuration of an optical characteristic evaluation system according to a present embodiment.

Hereinafter, one or more embodiments of the radiation imaging system and the radiation image imaging apparatus will be described with reference to the drawings. However, the scope of the invention is not limited to the disclosed embodiments.

According to the present embodiment, it is possible to provide an optical characteristic evaluation method and an optical characteristic evaluation system in which the unevenness of the optical characteristics of the optical film as the target of evaluation can be easily and quantitatively evaluated.

The embodiments of the present invention is described with reference to the drawings. However, the present invention is not limited to the illustrated examples.

First, terms used in the present description are described below.

1. Optical Film

An optical film which is to be the target of evaluation by the later-described optical characteristic evaluation system 100 is a transparent resin film including a specific function based on optical characteristics. The optical film is formed by extending, and includes an even optical characteristic (birefringence characteristics) in a plane if normally formed, but actually some kind of unevenness occurs.

The optical film includes, for example, a phase difference film, a protection film, a viewing angle enlarging film, a reflection prevention film, a reflection film, a substrate film, and the like, but the present embodiment is not limited to the above. Alternatively, a film combining a plurality of the above to be formed as one may be used.

2. Analyzer

The analyzer is a type of polarizing element and is used to find an amplitude direction of an entering linearly polarized light by rotating a transmission axis direction of the linearly polarized light which has a specific amplitude direction and which is taken out from natural light (random polarized light) by a polarizer.

3. Stokes Vector and Mueller Matrix (1) Stokes Vector

The polarized state can be described by a Stokes vector shown in the following formula (1). Specifically, the Stokes vector is a matrix with four lines and one column including four components (Stokes parameter) as described below in formula (1). The value of the Stokes parameter is set to a predetermined value so as to be able to express various polarized states.

formula (1)

$$S = \begin{bmatrix} s0 \\ s1 \\ s2 \\ s3 \end{bmatrix} \quad (1)$$

Each Stokes parameter in the formula is defined as below, s0: light intensity, s1: horizontal straight line polarizing component, s2: 45° straight line polarizing component, s3: circle polarizing component.

According to the present embodiment, light entering the optical film is described as input light, light transmitting the optical film and further transmitting the analyzer is described as output light, the Stokes vector of the input light and the output light is described as the following.

input light: $F1(s0, s1, s2, s3)^T$
horizontal straight line polarized light: $F1(1, 1, 0, 0)^T$
45° straight line polarized light: $F1(1, 0, 1, 0)^T$
perpendicular straight line polarized light: $F1(1, -1, 0, 0)^T$
right rotation circle polarized light: $F1(1, 0, 0, 1)^T$
random polarized light: $F(1, 0, 0, 0)^T$
output light: $F2(s0', s1', s2', s3')^T$ (2) Mueller Matrix The polarizing characteristics of the polarizing element (optical element which changes the polarized state of the entering light) such as the optical film as the evaluation target and the analyzer can be shown by the following matrix with four lines and four columns, that is, the Mueller matrix.

As shown in the following formula (2), if the Stokes vector of the input light is added to the Mueller matrix (M) of the polarizing element such as the optical film as the evaluation target, the Stokes vector of the output light can be obtained.

$$F2 = M \times F1 \quad (2)$$

According to the present invention, the Mueller matrix is shown by M=f1×f2. f1 is a matrix with four lines and four columns which can be shown using the phase difference and orientation angle of the optical film. f2 is a matrix with four lines and four columns which can be shown using the transmission axis of the analyzer.

If the optical film which is the target of evaluation is a laminated film including two or more films or is a laminated body including a polarizing element (for example, liquid crystal element), the polarizing characteristics of the laminated films or the polarizing element other than the above are shown by the Muller Matrix f1, f2, f3, f4, . . . and the Muller Matrix of the entire polarizing element can be shown by M=f1·f2·f3·f4.

4. Jones Vector and Jones Matrix (1) Jones Vector

The polarized state of the light can also be described by a Jones vector.

Any polarized state can be shown with a sum of two basic polarizing vectors which are orthogonal to each other. For example, in the Jones vector, the horizontal direction is to be an x-axis, a vertical direction is to be a y-axis, and the light shines in the z-direction. The amplitude of the light shining in the z-direction is divided in the x-direction and y-direction orthogonal to each other, and is shown as two amplitudes with phase differences.

(2) Jones Matrix

The polarizing characteristics of the polarizing element such as the optical film and the analyzer can be shown with a matrix with two lines and two columns, that is, a Jones matrix.

If the Jones vector of the input light is added to the Jones matrix of the polarizing element such as the optical film which is the target of evaluation, the Jones vector of the output light can be obtained.

5. Phase Difference

The value of the phase difference of the optical film can be usually defined by the following formula.

That is, a phase difference Ro in an in-plane direction of the optical film and a phase difference Rt in a thickness direction can be shown by the following formulas (3) and (4).

$$Ro = (n_x - n_y) \times d \quad (3)$$

$$Rt = \{(n_x + n_y)/2 - nz\} \times d \quad (4)$$

In the formula, $n_x$ shows a refractive index in a slow axis direction in the film plane, $n_y$ shows a refractive index in a fast axis direction in the film plane, nz shows a refractive index in the thickness direction of the film, and d shows the thickness (nm) of the film. The "slow axis" is an axis in which the speed of the advancing light becomes the slowest when the light transmits the film in which birefringence occurs and the phase is delayed. That is, this is the direction in which the refractive index in the plane becomes largest. The "fast axis" is the axis in which the speed of the light advancing becomes the fastest, and this is the direction in which the refractive index in the plane becomes the smallest.

According to the present embodiment, the phase difference value used in the calculation according to formula (2) is the phase difference value in the thickness direction and is shown by "r".

The phase difference is a value which changes depending on factors such as the wavelength of light irradiated on the optical film and the environment condition performing the measurement (temperature and humidity). Therefore, preferably, the conditions are set so that the phase difference becomes an arbitrary value according to the purpose of the optical characteristic evaluation and the type of optical film as the target of evaluation.

6. Orientation Angle

An orientation angle of the optical film refers to an angle between the orientation direction in which the molecule forming the phase difference film is oriented and a predetermined standard direction. Normally, the orientation angle matches with the angle formed by the in-plane slow axis of the phase difference film with relation to a predetermined standard direction.

According to the present embodiment, the orientation angle is the angle formed by the direction of the slow axis in the plane of the optical film as the evaluation target with relation to a horizontal direction (X-axis direction in FIG. 3), and is shown as "$\theta 1$".

7. Transmission Axis Direction

The transmission axis direction is an angle formed by the axis in which the analyzer transmits the vibration of the light, that is, the transmission axis, with relation to the predetermined standard direction.

According to the present embodiment, the transmission axis direction is the angle formed by the direction of the transmission axis of the analyzer with relation to the horizontal direction (X-axis direction in FIG. 3), and is shown as "$\theta 2$".

Configuration of Optical Characteristic Evaluation System 100

FIG. 1 shows an entire configuration of an optical characteristic evaluation system 100 employing the optical characteristic evaluation method according to the present invention. The optical characteristic evaluation system 100 is a system which evaluates unevenness of the optical characteristic of the optical film according to analysis of the polarized state of the light transmitting the optical film and the polarizing plate as the target of evaluation.

As shown in FIG. 1, the optical characteristic evaluation system 100 includes an optical characteristic measurement apparatus 1A and an optical characteristic evaluation apparatus 2A connected to each other to be able to transmit and receive data. The method of connecting the optical characteristic measurement apparatus 1A with the optical characteristic evaluation apparatus 2A is not limited. For example, the optical characteristic measurement apparatus 1A and the optical characteristic evaluation apparatus 2A can be connected by a Local Area Network (LAN) or can be connected wirelessly. The data measured by the optical characteristic measurement apparatus 1A is stored in an external server, and storage such as a HDD, CD, DVD, etc. can be used to input the measured data in the optical characteristic evaluation apparatus 2A. The optical characteristic evaluation apparatus 2A can be included in the optical characteristic measurement apparatus 1A as a function to perform the optical characteristic evaluation. The function to perform the optical characteristic evaluation means a function included in a program on the optical characteristic evaluation apparatus 2A or an individual program which runs on the computer of the optical characteristic evaluation apparatus 2A.

The optical characteristic measurement apparatus 1A is an apparatus which can measure the optical characteristics (birefringence characteristic) of the optical film as the target of measurement.

For example, the optical characteristic measurement apparatus 1A includes an irradiator, a polarizing plate, a wavelength plate, an imager, an analyzer, a communication I/F, and the like. The polarizing plate and the wavelength plate are provided between the irradiator and the imager, and an optical film as the target of measurement is positioned between the polarizing plate and the polarizing measurer. The irradiator includes an optical source and a filter, and arranges the polarized state of the random polarized light (natural light) through the polarizing plate and the wavelength plate to irradiate the light on the optical film. The imager includes a CCD (Charge Coupled Device) sensor and a CMOS (Complementary Metal Oxide Semiconductor) sensor, and takes in the light passing the polarizing plate and the measurement target to generate video signals. The result is transmitted to the analyzer. The analyzer specifies the phase difference and the orientation angle of the measurement target based on the video signal. The analyzer can generate two-dimensional distribution data of the birefringence characteristic two-dimensionally mapping the phase difference and the orientation angle which are measured from the measurement target. The obtained two-dimensional distribution data is transmitted to the optical characteristic evaluation apparatus 2A by the communication I/F.

The optical characteristic evaluation apparatus 2A is an apparatus to evaluate unevenness of the optical characteristics in the optical film using the data obtained by measuring the optical film. Specifically, the optical characteristic evaluation apparatus 2A applies the two-dimensional distribution data transmitted from the optical characteristic measurement apparatus 1A to the simulator designed in advance in order to predict the display irregularity which may occur due to the unevenness in the optical characteristics of the optical film if the optical film is included in the liquid crystal display apparatus.

Figure 2:
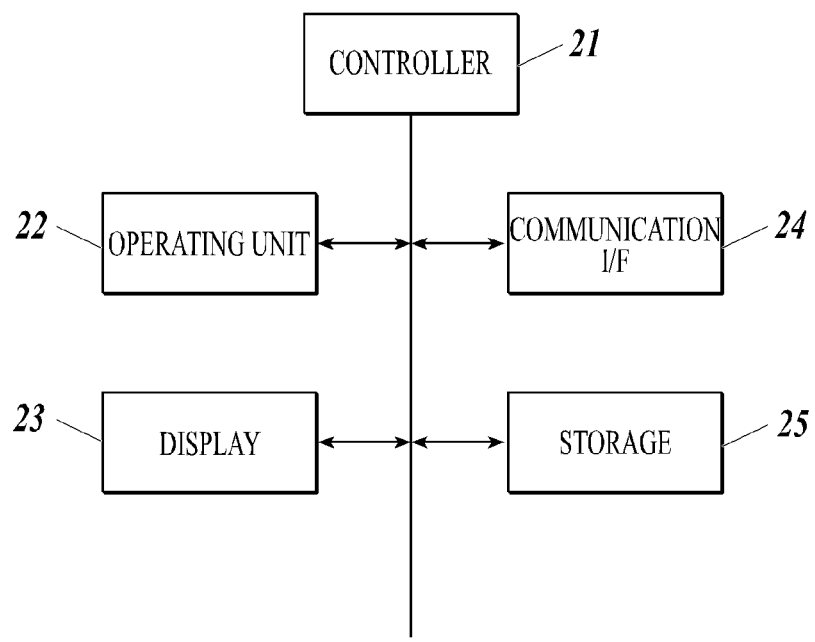
FIG. 2 is a diagram showing a functional configuration of an optical characteristic evaluation apparatus.

As shown in FIG. 2, the optical characteristic evaluation apparatus 2A includes a controller 21, an operating unit 22, a display 23, a communication I/F 24, and a storage 25, and the above units are connected to each other through a bus 26.

The controller (hardware processor) 21 includes a CPU (Central Processing Unit), a RAM (Random Access Memory), and the like. The controller 21 executes various processes in coordination with various programs stored in the storage 25 to centrally control the operation of the optical characteristic evaluation apparatus 2A. For example, the controller 21 performs the function to execute the later-described optical characteristic evaluation process in coordination with the program stored in the storage 25.

The operating unit 22 includes a keyboard provided with character input keys, numeral input keys and various function keys, and a pointing device such as a mouse. The operating unit 22 outputs to the controller 21 as the input signal the pressing signal of the key pressed on the keyboard and the operating signal of the mouse.

The display 23 includes a monitor such as a CRT (Cathode Ray Tube) or a LCD (Liquid Crystal Display). The display 23 displays various screens according to the instruction of the display signal input from the controller 21.

The communication I/F 24 is an interface to communicate data with external devices such as the optical characteristic measurement apparatus 1A.

Other than the above, the optical characteristic evaluation apparatus 2A may include a LAN adapter and a router, and may be connected with external devices through a communication network such as a LAN.

The storage 25 includes a HDD (Hard Disk Drive) or a semiconductor nonvolatile memory. The storage 25 stores various programs including a program to execute the optical characteristic evaluation process as described above and stores various data.

Here, the simulator used in the optical characteristic evaluation apparatus 2A according to the present embodiment is described with reference to FIG. 3. The simulator according to the present embodiment models the display screen 30 of the liquid crystal display apparatus in the VA (Vertical Alignment) format, and the display screen 30 includes a backlight 31, a first polarizing plate 32, and a second polarizing plate 33. The second polarizing plate 33 functions as an analyzer.

Figure 3:
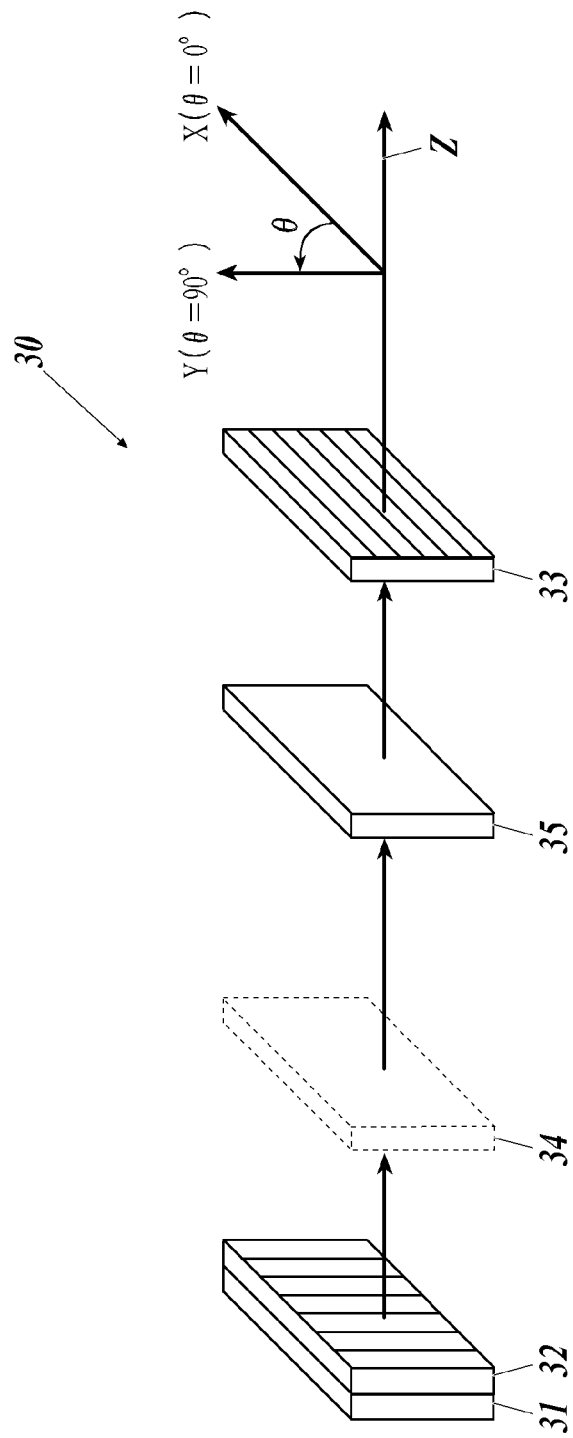
FIG. 3 is a diagram showing a simulation model according to the present invention.

In the description below, the X-axis direction (horizontal direction) in FIG. 3 is to be $\theta=0°$, the Y-axis direction (vertical direction) orthogonal to the X-axis is to be $\theta=90°$, and an orientation angle $\theta 1$ and a transmission axis direction $\theta 2$ are shown with an angle between the X-axis direction. The backlight 31, the first polarizing plate 32, and the second polarizing plate 33 are positioned on the XY plane, and the direction orthogonal to the XY plane (Z-axis direction in FIG. 3) is to be the front direction of the display screen 30.

In the normal liquid crystal display apparatus, the liquid crystal 34 is positioned between the first polarizing plate 32 and the second polarizing plate 33 as shown in FIG. 3. According to the present simulator, it is assumed that the phase difference in the front direction when black is displayed is to be 0, and this is ignored in the simulation.

The optical film 35 as the measurement target is positioned on the XY plane between the first polarizing plate 32 (liquid crystal 34 in the normal liquid crystal display apparatus) and the second polarizing plate 33.

Operation of Optical Characteristic Evaluation System 100 (Including Optical Characteristic Evaluation Method)

Hereinafter, the details of the optical characteristic evaluation process performed in the optical characteristic evaluation system 100 are described and the optical characteristic evaluation process according to the present embodiment is not limited to the above.

First, the operator measures the birefringence characteristics of the optical film as the evaluation target using the optical characteristic measurement apparatus 1A (step 1). Specifically, the optical film is positioned in the optical characteristic measurement apparatus 1A, a portion occupying a predetermined square area of the optical film is selected as the measured region. Regarding the pixel in a predetermined size included in the measured region, the phase difference r [nm] and the position angle $\theta 1$ [°] are measured for each pixel, and two-dimensional distribution data mapping the birefringence characteristic for each pixel is generated. Then, the operator transmits the generated two-dimensional distribution data to the optical characteristic evaluation apparatus 2A.

Here, the plurality of positions on the optical film are to be the measured region and the two-dimensional distribution data is generated for each region. The brightness in the plurality of measured regions are compared to be able to evaluate the unevenness of the optical characteristics in the entire optical film. Usually, the optical film is formed in a long shape, and there may be a variation in the optical characteristics between a front tip side and a rear tip side. Therefore, preferably, the two-dimensional distribution data is obtained with a predetermined interval in the longitudinal direction of the optical film.

According to the present embodiment, n positions with predetermined intervals in between are selected as measured regions, and birefringence characteristics for a pixels are measured for every measured region. That is, the birefringence characteristics for n×a pixels are measured in the entire optical film.

Figure 4:
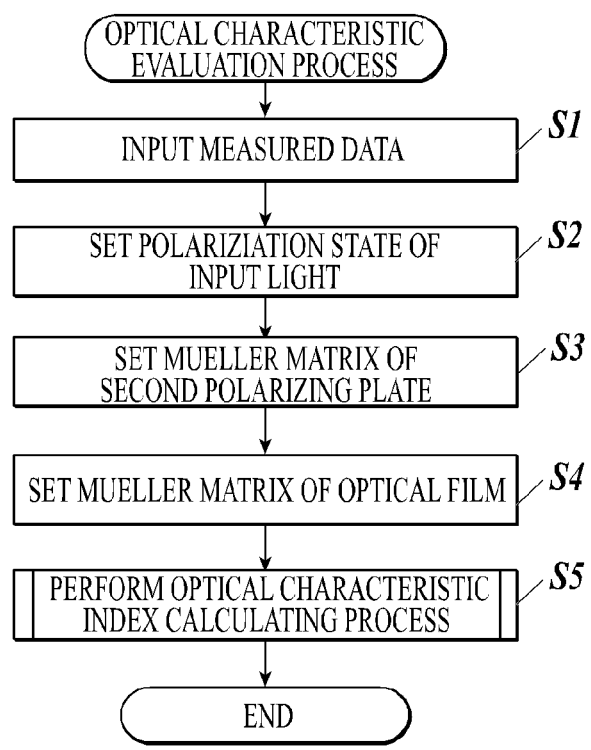
FIG. 4 is a flowchart showing an operation of an optical characteristic evaluation apparatus in an optical characteristic evaluation process.

FIG. 4 shows a flowchart of an optical characteristic evaluation process in the optical characteristic evaluation apparatus 2A. The optical characteristic evaluation process shown in FIG. 4 is executed by the controller 21 in coordination with a program stored in the storage 25.

When the measured data (two-dimensional distribution data) of the optical film is input from the optical characteristic measurement apparatus 1A by the communication I/F 24 (step S1), the controller 21 sets the polarized state of the input light used in the simulation (step S2).

As shown in FIG. 3, the input light here is light irradiated from the backlight 31 and applied with a predetermined polarized state by the first polarizing plate 32. The input light can be set to an arbitrary polarized state by setting the Stokes parameter in the Stokes vector of the input light.

Next, the controller 21 sets the Mueller matrix of the second polarizing plate 33 (step S3).

First, in step S3, the transmission axis direction $\theta 2$ of the second polarizing plate 33 is determined. Here, the present simulation assumes the liquid crystal display apparatus in the VA format. Therefore, it is necessary to position the first polarizing plate 32 and the second polarizing plate 33 in the crossed nicols state. That is, the input light transmitting through the first polarizing plate 32 enters the second polarizing plate 33 in the direction orthogonal to the transmission axis direction $\theta 2$ of the second polarizing plate 33. Therefore, based on the polarized state of the input light set in step S2, the transmission axis direction $\theta 2$ of the second polarizing plate 33 is set. For example, in step S2, the Stokes vector of the input light is set to F1 $(1, 1, 0, 0)^T$, that is, when set to the horizontal polarized light, the transmission axis direction $\theta 2$ is set to the value of 90°.

Next, the Mueller matrix of the second polarizing plate 33 (analyzer) is shown by using the set transmission axis direction $\theta 2$.

Next, the controller 21 sets the Mueller matrix for each pixel in which the optical characteristic is measured in the optical film 35 (step S4).

In step S4, first, the average value $\theta 1_{ave}$ of the orientation angles $\theta 1$ for all of the measured pixels is calculated. According to the present embodiment, the birefringence characteristics are measured for a pixels in every measured region in the n measured regions on the optical film 35.

Therefore, the average value $\theta 1_{ave}$ of the orientation angle $\theta 1$ of the n×a pixels is calculated.

Here, as described above, the irradiating of the input light is set in a direction orthogonal to the transmission axis direction $\theta 2$ of the second polarizing plate 33. Therefore, the average value $\theta 1_{ave}$ of the orientation angle of the optical film 35 is set to be a value substantially matching with the transmission axis direction $\theta 2$ of the second polarizing plate 33. Therefore, the calculated average value $\theta 1_{ave}$ is set to be the same value as or a value near the transmission axis direction $\theta 2$ calculated in step S3.

Here, when the average value $\theta 1_{ave}$ of the orientation angle is set to a value slightly shifted from the transmission axis direction $\theta 2$, the display irregularity due to the unevenness of the optical characteristic can be easily confirmed.

Figure 5:
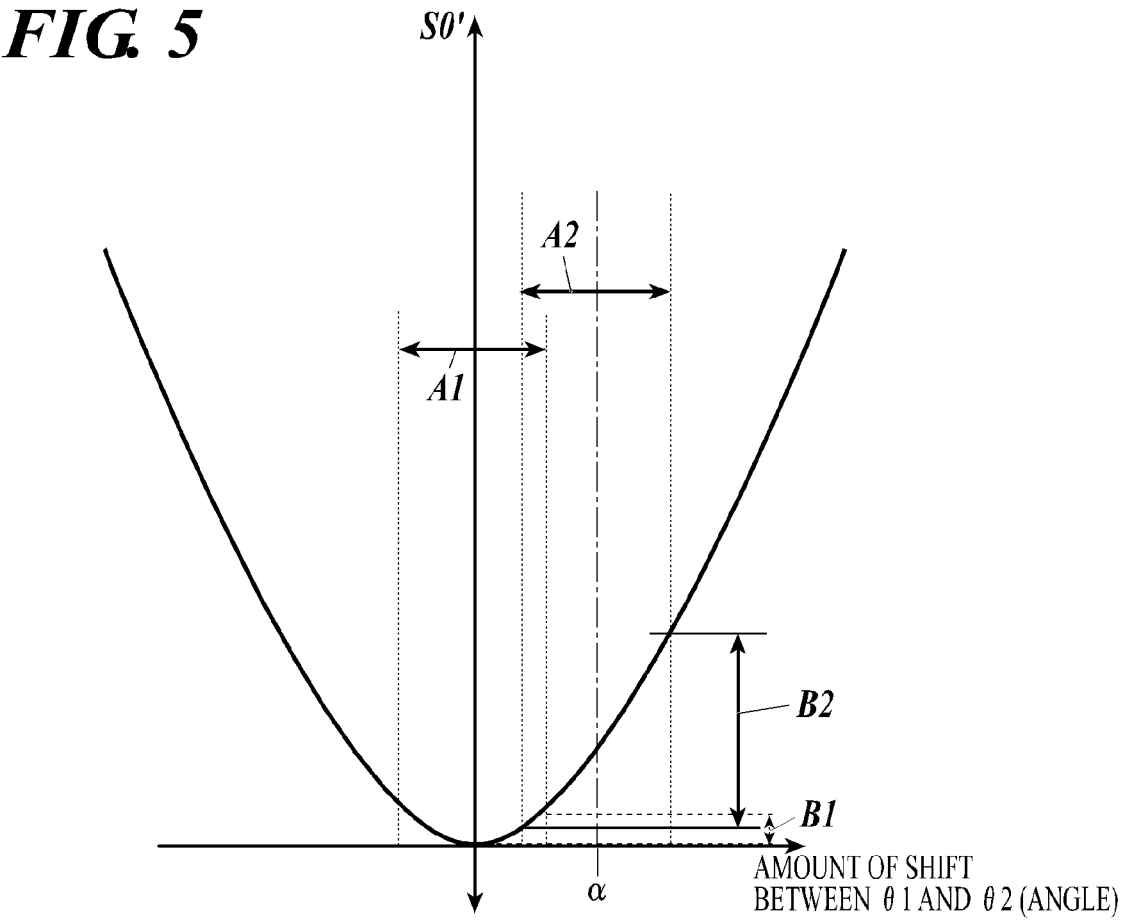
FIG. 5 is a diagram describing a relation between light intensity of output light and a displacement amount between an orientation angle and a transmission axis direction.

FIG. 5 is a diagram describing a relation between the shift amount of the $\theta 1_{ave}$ and $\theta 2$ and the optical strength of the output light. The horizontal axis shows the shift amount (angle) and the vertical axis shows the optical strength S0' of the output light. As shown in FIG. 5, $\theta 1_{ave}=\theta 2$, and if the variation of the $\theta 1_{ave}$, that is, the unevenness of the optical characteristic is within the range of A1, the optical strength S0' changes the range of B1 and with this, the display irregularity occurs. If the shift amount between the $\theta 1_{ave}$ and $\theta 2$ is the angle α, and the variation of the $\theta 1_{ave}$ is within the range of A2, the optical strength S0' changes within the range of B2 and the display irregularity becomes larger. If the shift amount between the $\theta 1_{ave}$ and $\theta 2$ becomes too large, the entire brightness becomes high and it becomes difficult to distinguish the display irregularity. Therefore, the difference amount needs to be within a certain range.

Therefore, according to the present embodiment, the range of the shift is preferably $|\theta 1-\theta 2| \leq 10°(\theta 1 \neq \theta 2)$, more preferably, $|\theta 1-\theta 2| \leq 2°(\theta 1 \neq \theta 2)$. For example, when the transmission axis direction $\theta 2$ is 90°, the average value $\theta 1_{ave}$ of the orientation angle is set to 90° or 80° to 100° (more preferably, 88° to 92°).

Next, the controller 21 executes the optical characteristic index calculating process (step S5). The optical characteristic index is the index to evaluate the unevenness of the optical characteristics in the measured regions in which the optical characteristic is measured.

Figure 6:
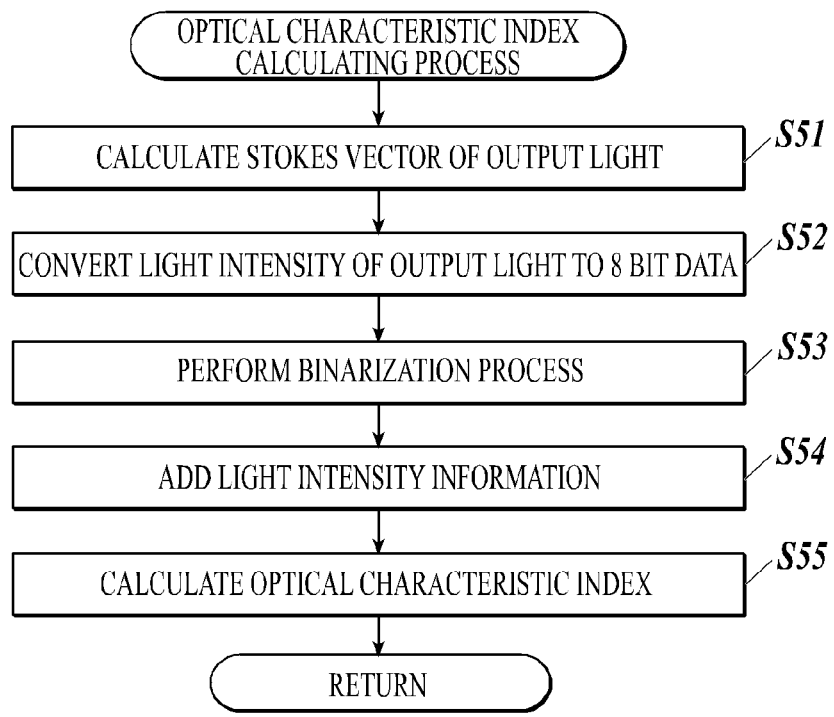
FIG. 6 is a flowchart showing an operation of an optical characteristic evaluation apparatus in an optical characteristic index calculating process.

FIG. 6 is a flowchart of the optical characteristic index calculating process of step S5. The process shown in FIG. 6 is executed by the controller 21 in coordination with the program stored in the storage 25.

First, in the optical characteristic index calculating process, the controller 11 calculates the Stokes vector of the output light in all of the pixels in which the optical characteristics are measured (step S51).

The output light refers to the light which transmits the second polarizing plate 33. The Stokes vector of the output light can be calculated by the calculation of the above-described formula (2) by using the phase difference r and the orientation angle $\theta 1$ measured for each pixel and the transmission axis direction $\theta 2$ of the second polarizing plate 33 set in step S4.

According to the present embodiment, the above calculation is performed for a pixels in every measured region in the n measured regions.

Next, the controller 21 converts the optical strength of the optical light calculated in step S5 to 8 bit data (step S52).

The output light is shown with F2 (s0', s1', s2', s3') using the Stokes vector as described above, and the light intensity of the output light is shown by the Stokes parameter s0'. In step S52, the value of s0' is converted to the data of 8 bit, that is, standardized in 256 shades. The method of standardizing is not limited, and for example, the value of s0' shown with the values between 0 to 1 can be converted to the value of 256 steps between 0 to 255, for example.

Next, the controller 21 performs the binarization process on the 8 bit data obtained in step S52 (step S53).

The binarization process is a process to perform a threshold process on the pixel values shown in 256 shades using a predetermined threshold in order to binarize the values in each pixel.

Next, the controller 21 adds the light intensity information (step S54).

Adding the light intensity information is a process regarding the pixels binarized in steps S53, and the number of pixels in which the value is a threshold or more in each measured region is counted to calculate the value dividing the number by the a pixels which is the square area of the measured regions.

Figure 7A:
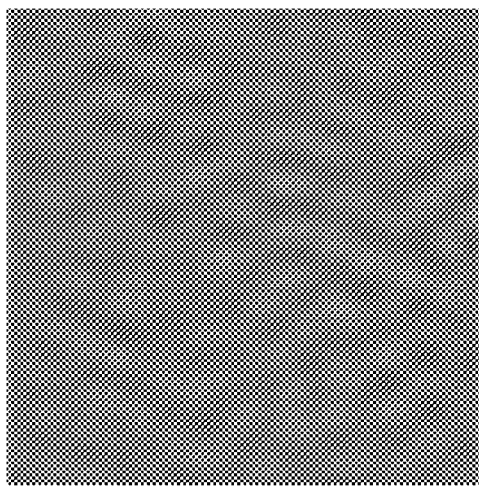
FIG. 7A is a diagram showing a concept of the optical characteristic index calculating process. The diagram shows an image obtained by standardizing light intensity of output light calculated in one measured region to 256 shades and mapping the above two-dimensionally.
Figure 7B:
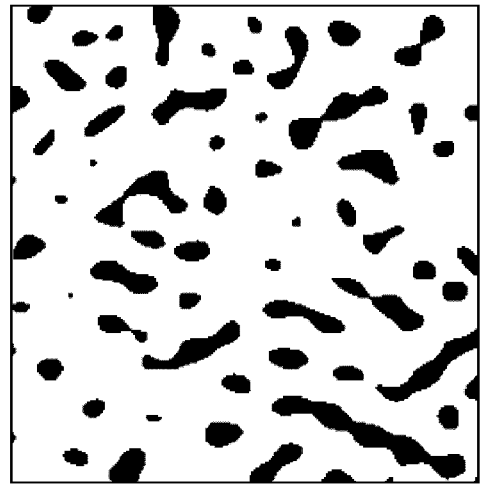
FIG. 7B is a diagram showing a concept of the optical characteristic index calculating process. The diagram shows an image obtained by performing a binarization process shown in step S53 on the image shown in FIG. 7A and visualizing the pixel with a value equal to or larger than a threshold.

FIG. 7A and FIG. 7B are diagrams describing the concept of the optical characteristic index calculating process. FIG. 7A shows an image obtained by standardizing in 256 shades the light intensity of the output light calculated in one measured region and two-dimensionally mapping the result. FIG. 7B shows an image obtained by performing the binarization process in step S53 on the image shown in FIG. 7A and visualizing the pixels with the threshold or more. That is, the process in step S54 counts the number of pixels visualized as shown in FIG. 7B and calculates the value dividing the pixel number by the total square area of the image shown in FIG. 7B.

The processes shown in steps S52 to S54 are performed in each of the n measured regions.

Next, the controller 21 calculates the optical characteristic index (step S55).

The optical characteristic index converts to numerals the degree of unevenness of the optical characteristics in the measured regions on the optical film 35. The method to calculate the optical characteristic index is not limited but the following method can be used, for example. Among the light intensities calculated for each of the n measured regions in step S54, if a maximum value is $S_{MAX}$, a minimum value is $S_{min}$, and the light intensity in a certain measured region is S, an optical characteristic index I in the measured region can be shown with the following formula (5).

$$I=(S-S_{min})/(S_{MAX}-S_{min}) \qquad (5)$$

The above index I is calculated for each of the n measured regions, and if the value S becomes $S_{MAX}$, the value I=1 and if the value S becomes $S_{min}$, the value I=0. That is, the optical characteristic index I is a value from 0 to 1, and as the value becomes larger, more pixels with high brightness exceeding the threshold are included. Therefore, it is possible to determine that the unevenness of the optical characteristics is high in the measured region.

EXAMPLES

The present invention is described in detail with reference to the examples, but the present invention is not limited to the illustrated examples.

The unevenness of the optical characteristics in the optical film is evaluated according to the methods described below.

Measurement of Birefringence Characteristics

A long film which is 2000 mm in the width direction is used as the optical film as the target of measurement.

The following three positions were selected, the center of the optical film in the width direction and positions 30 mm from each of both ends. Three regions are provided as the measured regions with an interval of 500 mm in the longitudinal direction in between the above selected positions. That is, a total of nine measured regions are provided.

Next, in each measured region, the birefringence characteristics (phase difference r and orientation angle θ1) are measured using an optical characteristic measurement apparatus (birefringence mapping measurement apparatus KAMAKIRI (registered trademark) by Photron) for a pixel at every 0.5 mm within a range with 175 mm in all four sides, that is, a total of 350×350=122500 pixels. Then, the average value $\theta_{ave}$ of the orientation angle is calculated.

The birefringence characteristics according to the present embodiment are measured under the following conditions, the wavelength of the light irradiated on the optical film is to be 520 [nm], and the environment is a temperature 23 [° C.] and humidity 50 [%].

Setting of Simulation Model

According to the examples 1 to 7 described below, the transmission axis direction of the second polarizing plate is to be θ2=90 [°], and the polarized state of the input light is set as the horizontal straight line polarized light shown with the Stokes vector F1 $(1, 1, 0, 0)^T$. In example 1, the setting value of the average value $\theta 1_{ave}$ of the orientation angle in the optical film is set to a value the same as the transmission axis direction θ2 of the second polarizing plate, $\theta 1_{ave}$=90 [°]. In the examples 2 to 7, the setting value of the average value $\theta 1_{ave}$ of the orientation angle in the optical film is set to a value shifted from 90 [°].

According to the examples 8 to 14, the transmission axis direction θ2 is set to an arbitrary value, and with this, the polarized state of the input light is set to any of the following, the horizontal straight line polarized light shown with the Stokes vector F1 $(1, 1, 0, 0)^T$, the right rotation polarized light shown with F1 $(1, 0, 0, 1)^T$, or vertical straight line polarized light shown with F1 $(1, -1, 0, 0)^T$. The setting value of the average value $\theta 1_{ave}$ of the orientation angle in the optical film is set to a value which matches with the transmission axis direction θ2 or a value shifted in a predetermined amount.

Calculation of Optical Characteristic Index

The optical characteristic index in each example is calculated as follows.

The light intensity of the output light is calculated by the above-described formula (2) using the phase difference r, the setting value of the average value $\theta_{ave}$ of the orientation angle, and the transmission axis direction θ2. After the value of the obtained light intensity is converted to 8 bit data, the binarization process is performed with the threshold 140. The number of pixels with the threshold 140 or more is counted in each measured region, and the value dividing the pixel number by 122500 pixels as the square area of the measured regions is calculated. The obtained value is used to calculate for all of the measured regions the optical characteristic index in each measured region as described above.

Evaluation of Optical Characteristics

In each example, the 9 measured regions were ranked from 1 to 9 based on the optical characteristic index calculated as described above in order starting from the measured region with the large optical characteristic index value.

The above process was repeated 10 times for each example, that is, the process was performed for 10 different sheets of optical films.

Table 1 shows the accuracy of the optical characteristic evaluation in the examples. The value of the phase difference r is shown using the display of "≈" in the example, and this shows the average value of all pixels considering the variation in each pixel.

TABLE 1

| | F1 $(s0, s1, s2, s3)^T$ | f1(r[nm], θ1[°]) | f2(θ2[°]) | COMPLEXITY | EVALUATION ACCURACY |
|---|---|---|---|---|---|
| EXAMPLE 1 | HORIZONTAL STRAIGHT LINE POLARIZED LIGHT: F1$(1, 1, 0, 0)^T$ | f1(r = λ/8, θ1 ave = 90) | f2(θ2 = 90) | AA | A |
| EXAMPLE 2 | HORIZONTAL STRAIGHT LINE POLARIZED LIGHT: F1$(1, 1, 0, 0)^T$ | f1(r = λ/8, θ1 ave = 101) | f2(θ2 = 90) | AA | A |
| EXAMPLE 3 | HORIZONTAL STRAIGHT LINE POLARIZED LIGHT: F1$(1, 1, 0, 0)^T$ | f1(r = λ/8, θ1 ave = 79) | f2(θ2 = 90) | AA | A |
| EXAMPLE 4 | HORIZONTAL STRAIGHT LINE POLARIZED LIGHT: F1$(1, 1, 0, 0)^T$ | f1(r = λ/8, θ1 ave = 99) | f2(θ2 = 90) | AA | AA |
| EXAMPLE 5 | HORIZONTAL STRAIGHT LINE POLARIZED LIGHT: F1$(1, 1, 0, 0)^T$ | f1(r = λ/8, θ1 ave = 81) | f2(θ2 = 90) | AA | AA |
| EXAMPLE 6 | HORIZONTAL STRAIGHT LINE POLARIZED LIGHT: F1$(1, 1, 0, 0)^T$ | f1(r = λ/8, θ1 ave = 91) | f2(θ2 = 90) | AA | AAA |
| EXAMPLE 7 | HORIZONTAL STRAIGHT LINE POLARIZED LIGHT: F1$(1, 1, 0, 0)^T$ | f1(r = λ/8, θ1 ave = 89) | f2(θ2 = 90) | AA | AAA |
| EXAMPLE 8 | VERTICAL STRAIGHT LINE POLARIZED LIGHT: F1$(1—, 1, 0, 0)^T$ | f1(r = λ/8, θ1 ave = 0) | f2(θ2 = 0) | AA | A |
| EXAMPLE 9 | RIGHT ROTATION CIRCLE POLARIZED LIGHT: F1$(1, 0, 0, 1)^T$ | f1(r = λ/8, θ1 ave = 90) | f2(θ2 = 90) | AA | A |
| EXAMPLE 10 | HORIZONTAL STRAIGHT LINE POLARIZED LIGHT: F1$(1, 1, 0, 0)^T$ | f1(r = λ/4, θ1 ave = 45) | f2(θ2 = 45) | AA | A |
| EXAMPLE 11 | HORIZONTAL STRAIGHT LINE POLARIZED LIGHT: F1$(1, 1, 0, 0)^T$ | f1(r = λ/8, θ1 ave = 99) | f2(θ2 = 90) | AA | AA |
| EXAMPLE 12 | VERTICAL STRAIGHT LINE POLARIZED LIGHT: F1$(1—, 1, 0, 0)^T$ | f1(r = λ/8, θ1 ave = 81) | f2(θ2 = 0) | AA | AA |
| EXAMPLE 13 | VERTICAL STRAIGHT LINE POLARIZED LIGHT: F1$(1—, 1, 0, 0)^T$ | f1(r = λ/8, θ1 ave = 1) | f2(θ2 = 0) | AA | AAA |
| EXAMPLE 14 | HORIZONTAL STRAIGHT LINE POLARIZED LIGHT: F1$(1, 1, 0, 0)^T$ | f1(r = λ/8, θ1 ave = 89) | f2(θ2 = 90) | AA | AAA |

TABLE 1-continued

| | F1 (s0, s1, s2, s3)$^T$ | f1(r[nm], θ1[°]) | f2(θ2[°]) | COMPLEXITY | EVALUATION ACCURACY |
|---|---|---|---|---|---|
| COMPARATIVE EXAMPLE 1 | — | | — | BB | — |
| COMPARATIVE EXAMPLE 2 | — | — | — | B | B |

In the comparative example 1 shown in table 1, the liquid crystal display apparatus including the optical film which is the same as the optical film used in the examples is made, and the display irregularity in the measured region set in the examples is observed by sight Ranking is performed from 1 to 9 starting from those determined to have a large variation in brightness and a large display irregularity Similar to the examples, this is repeated 10 times, that is, performed for the 10 sheets of optical films which are the same as the 10 different sheets of optical films used in the examples.

In the comparative example 2 shown in table 1, the optical film is placed between the two polarizing plates (first polarizing plate and second polarizing plate), the backlight irradiates the above and the display irregularity is observed by sight. The display irregularity in the measured region set in the examples in the optical film used in the examples is measured. The above is ranked from 1 to 9 in order starting from those determined to have a large display irregularity. Similar to the examples, this is repeated 10 times, that is, performed for the 10 sheets of optical films which are the same as the 10 different sheets of optical films used in the examples.

The "evaluation accuracy" in table 1 shows, among the rankings performed 10 times, the number of times the ranking in each example matched with the ranking of the comparative example 1 for the corresponding optical film. That is, the 10 sheets of optical films which are the same as the 10 sheets of optical films evaluated in the examples are evaluated in the comparative example 1 also. Among the 10 sheets of optical films, the number of sheets in which the ranking of the examples matches with the comparative examples is shown as the evaluation. The number of matches is shown in the evaluation as follows, B shows 0 to 2 matches, A– shows 3 to 4 matches, A shows 5 to 6 matches, AA shows 7 to 8 matches, and AAA shows 9 to 10 matches. That is, the more the evaluation result of the unevenness of the optical characteristics by the simulator in the examples matches with the result of the response evaluation of the display irregularity in the comparative example 1, it can be said that the display irregularity which occurs when the product is actually made is estimated more accurately.

The "complexity" shown in table 1 shows the complexity of the necessary process when the display irregularity due to the unevenness in the optical characteristic of the optical film is evaluated, and A shows that the complexity is low, B shows that the complexity is high and BB shows that the complexity is very high.

As shown in table 1, compared to the comparative example which makes the liquid crystal display apparatus itself, in each example, the birefringence attribute of the measured optical film is applied to the simulator set in advance to implement the embodiment, and therefore the complexity is low.

Regarding the evaluation accuracy, compared to if the $θ1_{ave}=θ2$ as shown in the example 1, it is clear that $|θ1-θ2|≤10°$ ($θ1≠θ2$) as shown in example 4 and example 5 is higher in accuracy, and $|θ1-θ2|≤2°$ ($θ1≠θ2$) as shown in example 6 and example 7 is even higher in accuracy. Turning to example 2 and example 3 showing $|θ1-θ2|>10°$ ($θ1≠θ2$), the evaluation accuracy reduces.

Further, in the examples 8 to 14 also, the optical characteristics can be evaluated with the highest accuracy if $|θ1-θ2|≤2°$ ($θ1≠θ2$).

In the comparative example 2, it is not possible to determine the display irregularity by sight, and the result of ranking is not displayed. It is assumed that the display irregularity became difficult to discriminate due to scattering of light occurring between the polarizing plate and the optical film and the entire brightness becoming high.

According to the description above, in the optical characteristic evaluation method according to the present embodiment, the phase difference and the orientation angle in the optical film are measured in a plurality of positions and the vector showing the polarized state of the input light and the matrix showing the polarizing characteristics of the optical film and the analyzer are used to quantitatively evaluate the unevenness of the optical characteristics based on the parameter of the vector of the output light obtained by calculation. Therefore, the burden of the number of steps is smaller and the method is easier compared to the method which makes the liquid crystal display apparatus and performs an evaluation as shown in the comparative example 1. However, the evaluation accuracy is the same as the comparative example 1. Moreover, compared to the method of observing the display irregularity by sight as shown in the comparative example 2, the evaluation can be made quantitatively.

Other Embodiments

The embodiments of the present invention are specifically described, but the embodiments are merely preferable embodiments, and the present invention is not limited to the above.

The above embodiment is described with a calculation using the Stokes vector and the Mueller matrix, but the embodiments are not limited to the above, and the Jones vector or the Jones matrix may also be used.

The above embodiment is described with an optical film used in a liquid crystal display apparatus but the embodiments are not limited to the above. For example, various optical films such as an optical film used in a display apparatus using an organic electroluminescence element can be widely applied.

The above embodiment describes a simulation model fixing the polarized state and the transmission axis direction θ2 of the input light and making the orientation angle θ1 variable, but the present embodiment is not limited to the above. The orientation angle θ1 can be fixed and the polarized state and the transmission axis direction θ2 of the input light can be variable. That is, steps 2, 3, and 4 can be any order.

According to the above description, a nonvolatile memory or a hard disk can be used as the computer readable medium storing the program regarding the above embodiments but the embodiments are not limited to the above. A portable recording medium such as a CD-ROM can be applied as other computer readable mediums. A carrier wave can be applied as the medium providing the data of the program regarding the present embodiments through communication lines.

Although embodiments of the present invention have been described and illustrated in detail, the disclosed embodiments are made for purposes of illustration and example only and not limitation. The scope of the present invention should be interpreted by terms of the appended claims The entire disclosure of Japanese Patent Application No. 2018-202514, filed on Oct. 29, 2018, including description, claims, drawings and abstract is incorporated herein by reference in its entirety.

What is claimed is:

1. An optical characteristic evaluation method which evaluates unevenness of an optical characteristic in an optical film based on analysis of a polarized state of light transmitting through an optical film as an evaluation target and an analyzer, the method comprising:
measuring a phase difference and an orientation angle in the optical film in a plurality of positions; and
quantifying and evaluating the unevenness of the optical characteristic based on a parameter of a vector of output light calculated by the following formula 1 using a vector showing a polarized state of input light and a matrix showing a polarizing characteristic of at least the optical film and the analyzer,
wherein, $$F2 = M \times F1, \quad \text{formula 1:}$$

F1: Stokes vector of input light
F2: Stokes vector of output light
M: Mueller matrix of the optical film as the evaluation target and the analyzer,
wherein the unevenness of the optical characteristic is evaluated based on the analysis of the polarized state of the light transmitting the optical film through at least the following steps (1) to (8), wherein,
step (1): selecting a plurality of measured regions in a predetermined square area in the optical film as the evaluation target and measuring the phase difference and the orientation angle for each pixel in a predetermined size included in the measured region,
step (2): showing and setting the polarized state of the input light with a Stokes vector,
step (3): setting the Mueller matrix of the analyzer,
step (4): setting the Mueller matrix of the optical film for each pixel,
step (5): calculating the Stokes vector of the output light using the above formula for each pixel,
step (6): showing a parameter regarding an optical intensity in the Stokes vector of the output light for each pixel with gradation in a predetermined number of bits,
step (7): setting a threshold in the gradation representation and showing by binarization,
step (8): making an index of display irregularity using a result shown by binarization.

2. The optical characteristic evaluation method according to claim 1, wherein the parameter of the vector of the output light is calculated by the following formula 2, wherein, $$F2 = f1 \times f2 \times F1, \quad \text{formula 2:}$$

f1: Mueller matrix or Jones matrix of the optical film as the evaluation target
f2: Mueller matrix or Jones matrix of the analyzer.

3. The optical characteristic evaluation method according to claim 1, wherein calculating is performed by setting conditions to satisfy the following formula 3 when the orientation angle of the optical film is θ1 and the transmission axis direction of the analyzer is θ2,
wherein, $$|\theta 1 - \theta 2| \leq 10°, \quad \text{formula 3:}$$

θ1≠θ2.

4. The optical characteristic evaluation method according to claim 1, wherein calculating is performed by setting conditions to satisfy the following formula 4 when the orientation angle of the optical film is θ1 and the transmission axis direction of the analyzer is θ2,
wherein, $$|\theta 1 - \theta 2| \leq 2°, \quad \text{formula 4:}$$

θ1≠θ2.

5. An optical characteristic evaluation system which evaluates unevenness of an optical characteristic in an optical film based on analysis of a polarized state of light transmitting through an optical film as an evaluation target and an analyzer, the optical characteristic evaluation system comprising:
a hardware processor which is configured to,
measure a phase difference and an orientation angle in the optical film in a plurality of positions; and
quantify and evaluate the unevenness of the optical characteristic based on a parameter of a vector of output light calculated by the following formula 1 using a vector showing a polarized state of input light and a matrix showing a polarizing characteristic of at least the optical film and the analyzer,
wherein, $$F2 = M \times F1, \quad \text{formula 1:}$$

F1: Stokes vector of input light
F2: Stokes vector of output light
M: Mueller matrix of the optical film as the evaluation target and the analyzer,
wherein the unevenness of the optical characteristic is evaluated based on the analysis of the polarized state of the light transmitting the optical film through at least the following steps (1) to (8), wherein,
step (1): selecting a plurality of measured regions in a predetermined square area in the optical film as the evaluation target and measuring the phase difference and the orientation angle for each pixel in a predetermined size included in the measured region,
step (2): showing and setting the polarized state of the input light with a Stokes vector,
step (3): setting the Mueller matrix of the analyzer,
step (4): setting the Mueller matrix of the optical film for each pixel,
step (5): calculating the Stokes vector of the output light using the above formula for each pixel,
step (6): showing a parameter regarding an optical intensity in the Stokes vector of the output light for each pixel with gradation in a predetermined number of bits,
step (7): setting a threshold in the gradation representation and showing by binarization, step (8): making an index of display irregularity using a result shown by binarization.

* * * * *